United States Patent Office 3,539,948
Patented Nov. 10, 1970

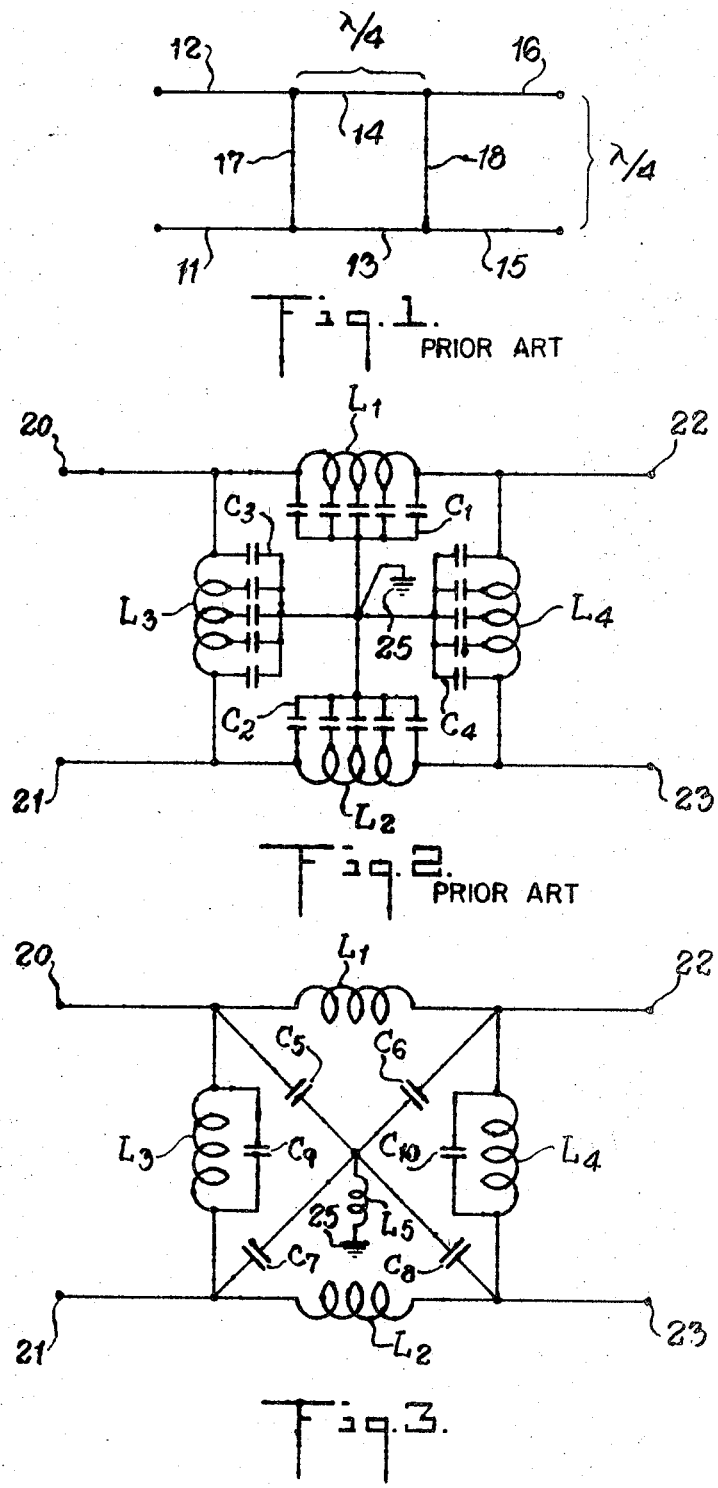

3,539,948
RADIO FREQUENCY DIRECTIONAL COUPLERS
Edward Salzberg, 19 Black Oak Road,
Wayland, Mass. 01778
Filed Nov. 6, 1968, Ser. No. 773,925
Int. Cl. H01p 5/14; H03h 7/04
U.S. Cl. 333—10                    1 Claim

ABSTRACT OF THE DISCLOSURE

Four terminal directional couplers are described in which radio frequency energy fed into a first terminal selectively divides between two of the remaining terminals with negligible output at the fourth terminal. The described couplers use lumped values in the form of five inductors and four capacitors in a manner to approximate the parameters of a branch line coupler.

BACKGROUND OF THE INVENTION

Directional couplers take many forms. Common configurations at microwave frequencies utilize coaxial line or waveguide. Many of the various configurations however are adaptations of the simple branch line coupler depicted diagrammatically in FIG. 1. Each component 13, 14, 17 and 18 of this coupler is one quarter of a wavelength long at the operating frequency. Terminal lines 11, 12, 15 and 16 each represent infinitely long transmission lines or terminations with a characteristic impedance equivalent to the transmission line impedance. Components 17 and 18 each have an impedance relation with respect to components 13 and 14 of 1 to $1/\sqrt{2}$. At UHF frequencies and higher, to provide a coupler, as depicted in FIG. 1 or analogous couplers, using waveguide or coaxial line presents no great difficulty. However with lower frequencies the size of the branch line coupler becomes inconvenient. To overcome the space limitations, it is a common practice to simulate the quarter wavelength lines with lumped values of capacitance and inductance using discrete capacitors and inductors. Ideally the inductors are connected in series in each component line and an infinite number of capacitors are connected in distributed fashion between the inductors and reference as indicated in FIG. 2. Dealing with quarter wavelengths, the values for each component are obtained by selecting $$C = \tfrac{1}{4} fZ$$

and $$L = \tfrac{1}{16} Cf^2$$

where C is the capacitance in farads, $f$ is the operating frequency in cycles per second, Z is the impedance in ohms for the respective component in accordance with FIG. 1 and L is the inductance in henries.

FIG. 2 represents a coupler with lumped capacitance infinitely distributed across lumped inductance in each branch of the coupler. This would be the electrical equivalent of the coaxial line coupler. The coupler of FIG. 2 is represented as having two input terminals 20, 21 and two output terminals 22, 23. Inductances $L_1$ and $L_2$ are connected serially between terminals 20 and 22 and terminals 21 and 23 respectively. Distributed capacitances $C_1$ and $C_2$ are connected from inductances $L_1$ and $L_2$ respectively to reference terminal 25. Reference terminal 25 in operation is connected to the ground or other reference point for the energy source from which electromagnetic energy is applied to the coupler. Inductances $L_3$ and $L_4$ are connected transversely between terminals 20 and 21 and terminals 22 and 23 respectively. Distributed capacitances $C_3$ and $C_4$ are connected from inductances $L_3$ and $L_4$ respectively to reference terminal 25.

Designed as a 3 megahertz 50 ohm branch line coupler, the lumped constants for FIG. 2 are calculated as follows:

$C_1 = \tfrac{1}{4} fZo/\sqrt{2} = \tfrac{1}{4}(3 \times 10^6)35.3 = .00236 \mu f.$
$C_2 = C_1$
$C_3 = \tfrac{1}{4} fZo = \tfrac{1}{4}(3 \times 10^6)50 = .00166 \mu f.$
$C_4 = C_3$
$L_1 = \tfrac{1}{16} Cf^2 = C(Zo/\sqrt{2})^2 = (.236 \times 10^{-8})35.3^2 = 2.9 \mu h.$
$L_2 = L_1 \quad L_4 = L_3$
$L_3 = \tfrac{1}{16} Cf^2 = CZo^2 = (.166 \times 10^{-8})50^2 = 4.16 \mu h.$ The capacitances of FIG. 2 cannot practically be easily distributed in the infinite manner suggested. In practical embodiments the lumped capacitances are more conveniently connected at each end of each inductance. The results of such arrangements have usually been a loss of bandwidth as compared with conventional transmission lines.

SUMMARY OF THE INVENTION

The present invention provides a four terminal directional coupler having lumped values of inductance and capacitance. In this coupler, improved performance is provided by connecting one end of each of four lumped capacitance to the junction of two of four lumped inductances and the other end through a common fifth inductance to a reference terminal of the coupler. Thus it is an object of the invention to provide a novel directional coupler using lumped parameters.

It is a further object of the invention to provide a wide band four terminal directional coupler using four lumped inductance, four lumped capacitances and a fifth common inductance providing a common connection to reference for all said capacitances.

BRIEF DESCRIPTION OF THE DRAWING

FIG. 1 is a schematic diagram of a prior art branch line coupler.

FIG. 2 is a schematic diagram of a prior art distributed capacitance coupler.

FIG. 3 is a schematic diagram of a coupler according to the invention.

In attempting to simplify the characteristics of the lumped constant coupler, four capacitors, $C_5$, $C_6$, $C_7$, and $C_8$ of FIG. 3, were connected between reference 25 and respective intersections of inductance $L_3$, $L_1$, $L_4$ and $L_2$. For this purpose each capacitor was given a value calculated as one half the sum of the distributed capacitances determined for association with the inductors on each side of the intersection in accordance with FIG. 2. Thus:

$C_5 = (C_1 + C_3)_2 = (.00236 + .00166)_2 = .00201$
$C_6 = C_7 = C_8 = C_5$

From a practical standpoint of production cost, the reduction in both number and variety of capacitors is a substantial saving. For several reasons this arrangement operates rather poorly. A crudely lumped line is not electrically equivalent to an infinitely distributed line and can not be expected to operate the same. In particular, by combining the capacitance for the lines containing $L_1$ and $L_3$ into $C_5$, for example, we are adding an element that is mutual to both lines. This condition is infinitely small in a true distributed line. Several attempts were made and only one, gave excellent results. The reason was an accident that was only recognized after considerable effort.

The connection between the capacitors and reference 25 was made by joining the reference end of the capacitors directly and then connecting the junction to the reference connection as depicted in FIG. 3. In the high performance unit, the connecting lead between the junction and reference 25 was longer than in the other units. Further experiment proved that this extra length provided critical inductance $L_5$. Depending on the frequency of the coupler, inductance $L_5$ is provided by a piece of straight or bent wire or a coil. The value of $L_5$ has been empirically determined as approximately equal to one-twelfth the value of $L_1$ (or $L_2$).

In a 2.9 megahertz coupler built according to FIG. 3 the values are slightly different from the calculated values due possibly to tolerances in the components and stray reactances.

The actual components used were commercial components with a ±10% tolerance. The values chosen were limited by commercial availability and were rated as follows:

$L_1$=2.7 μh. (microhenries)
$L_2$=2.7 μh.
$L_3$=3.9 μh.
$L_4$=3.9 μh.
$C_5$=$C_6$=$C_7$=$C_8$ .00217 μf. (microfarads)
$L_5$=.22 μh.
$C_9$=$C_{10}$=94 pf. (picofarads)

Capacitors $C_9$ and $C_{10}$ are compensating capacitors added in parallel to $L_3$ and $L_4$ to raise the effective value of the commercial inductors. Thus the 3.9 μh. inductors behave like 4.35 μh. inductors. Capacitors $C_9$ and $C_{10}$ are not critical to the invention and are unnecessary when inductors of the proper values are used.

The performance characteristics were measured as given below. A signal generator was connected to input terminal 20. A matching pad and bolometer were connected in turn to each of the other three terminals with the unused terminals terminated with reflection-less terminators.

Balance is given as the output of terminal 23 relative to terminal 22. Directivity is given as the output of terminal 23 relative to terminal 21.

| Frequency (mHz.) | Balance (db) | Directivity (db) |
|---|---|---|
| 2.5 | +.70 | 9.5 |
| 2.7 | +.15 | 14.0 |
| 2.9 | +.15 | 23.0 |
| 3.1 | +.35 | 14.7 |
| 3.3 | +.45 | 11.0 |

To determine the values for couplers at other frequencies, the formulas already provided can be used or the component values can be scaled using the following rules:

(1) All inductance values are inversely proportional to frequency.
(2) All capacitance values are inversely proportional to frequency.
(3) All inductance values are proportional to $Z_0$.
(4) All capacitance values are inversely proportional to $Z_0$.

It has been found that useful couplers can be made with component values differing as much as 20% from the theoretical values. The value of $L_5$ is even less critical. A minus 50% to plus 100% tolerance on $L_5$ can still produce a useful coupler. $L_5$ is nevertheless an essential component since without it the best directivity achieved was an unusable 5 db.

To prove the validity of scaling, four empirically derived designs of different center frequencies and/or characteristic impedances were normalized for a 3 mHz. 50 ohm coupler.

The following table shows the scaled values, scaled up and down from the four empirically derived designs, compared to the theoretical values calculated for a 3 mHz. 50 ohm coupler.

| | Calculated | Scaled | | | |
|---|---|---|---|---|---|
| Coupler center freq., mHz | 3 | 2.9 | 30 | 26 | 28 |
| Design impedance, ohms | 50 | 50 | 50 | 50 | 50 |
| $L_1$ and $L_2$ | 2.9 μh. | 2.81 | 3.1 | 2.60 | 2.42 |
| $L_3$ and $L_4$ | 4.16 μh. | 4.35 | 5.07 | 3.55 | 3.64 |
| $L_5$ | | .212 | | | |
| $C_5$-$C_8$ | 2,010 pf. | 2,250 | 2,120 | 1,730 | 1,870 |

It will be noted that these values vary as much as 20% from the calculated. One reason is the 10% tolerance of the commercial components (rated rather than measured values were used in the calculations for the inductors). A more important reason is that the four couplers were not really optimized. They were designed only to reach specified commercial standards.

It was not possible to scale the $L_5$ values from the 26, 28 and 30 mHz. designs because the inductance of $L_5$ was too small at these frequencies to be easily measured with the available equipment. Scaling from the μh. for $L_5$ at 3 mHz. 50 ohms to 26 mHz. or more will show that the inductance of $L_5$ becomes too small to be more than a short length of wire.

While the invention has been described with respect to a 3.0 megahertz coupler, it is applicable to any frequency at which the use of lumped constants are practical. Thus it is intended to claim the invention broadly within the spirit and scope of the appended claim.

I claim:
1. A lumped constant radio frequency directional coupler comprising:
   (a) first and second input terminals;
   (b) first and second output terminals;
   (c) a first inductor connected between said first input terminal and said first output terminal;
   (d) a second inductor connected between said second input terminal and said second output terminal;
   (e) a third inductor connected between said first input terminal and said second input terminal;
   (f) a fourth inductor connected between said first output terminal and said second output terminal;
   (g) first, second, third and fourth capacitors each having a first electrode connected to a respective one of said terminals and each having a second electrode; and,
   (h) single inductive means, having an inductive value equal to substantially one twelfth the inductance of one of said first inductor and said second inductor, connecting said second electrode of each said capacitors in common to a reference terminal, whereby radio frequency energy applied between said first input terminal and said reference terminal divides between said first and second output terminals with substantially no output at said second input terminal all with respect to said reference terminal.

References Cited

UNITED STATES PATENTS 2,883,647   4/1959   Leeds et al.

P. L. GENSLER, Primary Examiner

U.S. Cl. X.R.

333—74